(12) United States Patent
Russ et al.

(10) Patent No.: US 10,714,714 B2
(45) Date of Patent: Jul. 14, 2020

(54) ELECTRICAL ENERGY STORE, SPECIFICALLY A BATTERY CELL, WITH SPATIALLY-OPTIMIZED ELECTRODE INTERCONNECTION

(71) Applicant: Robert Bosch GmbH, Stuttgart (DE)

(72) Inventors: Andreas Russ, Wurmberg (DE); Roland Gauch, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 81 days.

(21) Appl. No.: 15/844,892

(22) Filed: Dec. 18, 2017

(65) Prior Publication Data

US 2018/0175336 A1 Jun. 21, 2018

(30) Foreign Application Priority Data

Dec. 16, 2016 (DE) .................. 10 2016 225 252

(51) Int. Cl.
| | |
|---|---|
| H01M 2/06 | (2006.01) |
| H01G 11/76 | (2013.01) |
| H01M 2/22 | (2006.01) |
| H01M 2/26 | (2006.01) |
| H01G 11/72 | (2013.01) |
| H01G 11/82 | (2013.01) |
| H01M 2/20 | (2006.01) |

(Continued)

(52) U.S. Cl.
CPC .............. *H01M 2/06* (2013.01); *H01G 11/72* (2013.01); *H01G 11/76* (2013.01); *H01G 11/82* (2013.01); *H01M 2/202* (2013.01); *H01M 2/22* (2013.01); *H01M 2/266* (2013.01); *H01G 2/20* (2013.01); *H01M 2/0207* (2013.01); *H01M 2220/20* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 2010/0203371 A1* | 8/2010 | Nagai | H01M 2/30 429/94 |
| 2016/0240325 A1* | 8/2016 | Tajima | H01G 11/26 |

(Continued)

FOREIGN PATENT DOCUMENTS

| | | |
|---|---|---|
| DE | 102015209045 | 11/2016 |
| EP | 2360770 | 8/2011 |
| JP | 2015176701 | 10/2015 |

*Primary Examiner* — Scott J. Chmielecki
(74) *Attorney, Agent, or Firm* — Michael Best & Friedrich LLP

(57) ABSTRACT

An electrical energy store having a spatially-optimized electrode interconnection. The electrical energy store (1) comprises flat electrodes (3), flags (7) projecting laterally from the electrodes (3), and external terminals (9). A plurality of electrode regions are respectively stacked, one on top of another, to form an electrode stack (14). A plurality of flags (7) are arranged one on top of another in a flag stack (15), and are respectively materially bonded, both mutually and with an associated external terminal (9). The energy store is characterized in that each flag (7) of a plurality of flags (7) in a flag stack (15), which is bonded to the associated external terminal (9), is materially bonded to a respectively adjoining flag (7) in a region in which the flag (7) is oriented in an inclined direction at an angle ($\alpha$) to the surface (11) of the associated external terminal (9).

17 Claims, 3 Drawing Sheets

(51) Int. Cl.
*H01G 2/20* (2006.01)
*H01M 2/02* (2006.01)

(56) References Cited

U.S. PATENT DOCUMENTS

| | | | |
|---|---|---|---|
| 2016/0336545 A1* | 11/2016 | Wakimoto | H01M 2/266 |
| 2017/0040635 A1* | 2/2017 | Choi | H01M 10/0583 |
| 2018/0026254 A1* | 1/2018 | Oh | H01M 2/10 |
| | | | 429/153 |
| 2018/0123110 A1* | 5/2018 | Hirose | H01M 10/0585 |
| 2018/0226626 A1* | 8/2018 | Maeda | H01M 10/0585 |
| 2018/0315982 A1* | 11/2018 | Daidoji | H01M 2/30 |

* cited by examiner

ELECTRICAL ENERGY STORE, SPECIFICALLY A BATTERY CELL, WITH SPATIALLY-OPTIMIZED ELECTRODE INTERCONNECTION

BACKGROUND OF THE INVENTION

The invention relates to an electrical energy store, specifically a battery cell.

Electrical energy stores in the form, for example, of batteries or power capacitors ("supercaps") are employed in both mobile and stationary applications. Specifically in mobile applications such as, for example, an energy accumulator system in an electric or hybrid vehicle, or in mobile devices such as portable computers, mobile telephones etc., it is advantageous if the requisite space for an energy store is minimized, i.e. the volumetric efficiency of the energy store is maximized. The space occupied by an energy store is influenced by a variety of different components in said energy store, specifically by the volume of the electrodes employed, the volume of active or electrolytic material, or of dielectric material present between said electrodes, and of the in-battery interconnection arrangement, by means of which the electrodes are electrically bonded to the external terminals which are provided for the purposes of external connection.

An energy accumulator device, and a method for the manufacture thereof, are described in JP 2015-176701 A.

SUMMARY OF THE INVENTION

Forms of embodiment of the present invention can advantageously be employed for the configuration of an electrical energy store with a low volume and a high volumetric efficiency. Moreover, the energy store can be manufactured in a cost-effective manner.

According to one aspect of the invention, an electrical energy store is proposed, comprising at least two flat electrodes, flags projecting laterally from said electrodes, and at least two external terminals. A plurality of electrode regions are respectively stacked, one on top of another, to form an electrode stack. A plurality of flags are arranged one on top of another in a flag stack, and are respectively materially bonded, both mutually and with an associated external terminal. The energy store is characterized in that each flag of a plurality of flags in a flag stack, which is bonded to the associated external terminal, is materially bonded to a respectively adjoining flag in a region in which the flag is oriented in an inclined direction to the surface of the associated external terminal.

Ideas for forms of embodiment of the present invention can be considered inter alia on the basis of the concepts and findings described hereinafter.

An electrical energy store in the form of a battery cell, a power capacitor or similar generally comprises at least two, and in many cases a plurality of electrodes. The electrodes are of planar design, and are formed of an electrically-conductive material, generally a metal such as, for example, copper or aluminum. For example, electrodes can be configured in the form of thin foils, e.g. of thickness ranging from a few micrometers up to several tens of micrometers. A flat-surface expanse of electrodes can thus comprise a number of square centimeters, up to several square centimeters, or even square meters. Adjoining electrodes are generally mutually spaced by means of an interspace, wherein the interspace is generally thicker than the electrode, typically of the order of 50 μm to 1 mm, depending upon the type of construction. In battery cells, this interspace is generally filled with an active material, i.e. a material for the temporary and chemically-reversible storage of electrical energy, or an electrolyte material. In general, each electrode is bonded to its coating in an electrically-conductive manner, and an electrical insulator is generally arranged between the electrodes, which permits ionic conduction. In capacitors, the interspace is generally filled with a dielectric.

In order, firstly, to permit the storage of sufficient energy in the energy store, and secondly to permit the tapping of energy at a high power rating, electrode regions are stacked in stack formations. In pouch-type battery cells, for example, at least two large-surface electrodes are interwound, such that the various electrode regions thereof form the desired electrode stack. In battery cells of different types, a plurality of separate electrodes can be stacked one on top of another to form an electrode stack. Between the electrode regions, the active material and/or the electrolyte or the dielectric is located, which can be applied to the constituent foil of the electrodes, for example, by a variety of coating technologies.

In order to permit the electrical contacting of electrodes from the exterior, electrodes are generally provided with two-dimensional lateral projections, arranged at the edges thereof, described as flags or lugs. These flags are electrically-conductive, and are generally configured integrally to the electrodes. For example, a foil-type electrode, on its lateral edge, can incorporate projecting elements of foil, which are cut to an appropriate shape and, in the finished electrical energy store, are not coated with the active material, or with the electrolyte or dielectric, but wherein the metal foil, for example, is left exposed.

In order to permit the electrical bonding of electrode regions, both mutually and with one of the external terminals, the flags of adjoining electrode regions of an electrode stack are also stacked in a stack formation, described herein as a flag stack. Conventionally, a plurality of flags, which project from different electrodes, are combined in a stack, and are arranged laterally on an outer surface of one of the external terminals. At least the ends of all the flags are arranged adjacently in the region of the surface of the external terminal and, at least in this region, are configured in a mutually parallel arrangement. In an arrangement of this type, the ends of the flags can be electrically bonded, both mutually and with the external terminal, by welding or by another means.

In this context, the term "external terminal" is to be interpreted broadly, and can refer to an exposed and electrically-conductive terminal such as, e.g. a metal terminal, which can be directly contacted from the exterior of the electrical energy store, for example, for the electrical interconnection of adjoining energy stores. However, the term can also refer to an electrical conductor which is routed to an exposed terminal of this type such as, e.g. a foil or a sheet metal strip, which is arranged on the interior of the electrical energy store.

However, as further described in detail hereinafter with reference to FIGS. 1 and 2, a relatively large space is required for the conventionally employed type of electrical connection of the flags and the external terminal.

It is therefore proposed that the means by which adjoining flags and an external terminal are interconnected, and specifically a geometrical configuration and arrangement of flags with respect to interconnection, should be configured in a specific manner, in order to permit the interconnection thereof in a space-saving arrangement.

Specifically, it is proposed that not all the flags in a flag stack should be routed to the associated external terminal, where they are bonded, both mutually and to the external terminal, in a parallel arrangement. Instead, at least a majority of the flags, i.e. more than 50%, and preferably more than 90% of the flags in a flag stack are bonded, both mutually and to the external terminal, such that a region in which adjoining flags are mutually materially bonded is not oriented in parallel with a surface of the external terminal, but is inclined relative to the latter. An angle $\alpha$ between the extension direction of the flags and the extension direction of the surface of the external terminal, in pouch-type cells, can typically be between 0.5° and 20°, preferably between 1° and 10°. The specified angle applies at least to that region of the flag in which the latter is materially bonded to an adjoining flag. In cell types other than pouch-type cells, in which the cells, for example, are stacked separately one on top of another, at least a number of flags, at least in the joining region, can even be oriented with substantially larger angles of up to 90°, or even up to 110°, relative to the external terminal. The flags of one of the electrodes can firstly extend e.g. in a parallel direction to the extension of the electrode, before curving towards the external terminal, in order to be joined to an adjoining flag in the vicinity thereof.

By the arrangement of adjoining flags in a flag stack thus described, relative to each other and relative to the surface of the external terminal, the latter can be mutually interconnected in a highly space-saving manner.

According to one form of embodiment, different flags in a flag stack project to a different extent beyond the edge of the electrode. In other words, the length by which flags project beyond the edge of the electrode is not equal for all the flags in a flag stag, in the conventional manner generally applied hitherto, but some of the flags can be shorter than other flags in the same flag stack. Accordingly, as further clarified hereinafter with reference to the drawings, adjoining flags can be advantageously arranged such that the latter can be mutually bonded in a simple and space-saving manner.

Specifically, according to one form of embodiment, non-external terminal-adjacent flags in a flag stack project beyond the edge of the associated electrode to a lesser extent than the external terminal-adjacent flags in the flag stack. In other words, non-terminal-adjacent flags can be shorter than terminal-adjacent flags.

Non-terminal-adjacent flags are to be understood as those flags in a flag stack, the associated electrodes of which are arranged in planes which are further removed from a plane in which the associated external terminal is arranged than those planes in which the terminal-adjacent flags of the same flag stack are located. In other words, electrode regions which are arranged further outwards in a flag stack, i.e. are further removed from the plane of the external terminal, preferably have shorter flags than those electrode regions which are arranged further inwards in the flag stack.

It can thus be achieved that adjoining flags overlap, such that the latter can be mutually materially bonded in a simple and space-saving manner.

According to one form of embodiment, non-external terminal-adjacent flags in a flag stack, in a bonding region in which they are respectively materially bonded to an adjoining flag, are arranged at a greater angle, relative to the surface of the associated external terminal, than external terminal-adjacent flags of the flag stack, in the bonding region thereof.

In other words, the more outward-lying flags in a flag stack can be oriented more obliquely to the surface of the associated external terminal than the more inward-lying flags, and are thus bonded to a respectively adjoining flag in a bonding region which is oriented highly obliquely to the surface of the associated external terminal. The angle of inclination, at which a bonding region is oriented relative to the surface of the associated external terminal, can thus increase successively from the terminal-adjacent flags to the non-terminal-adjacent flags, for example from a very small angle of less than 5°, and preferably less than 2°, for external terminal-adjacent flags, up to a maximum angle, for example in excess of 10°, or even in excess of 20°, for non-external terminal-adjacent flags. The maximum angle can be subject to an upper limit, in that excessive bending angles within a flag can cause damage to the flag, specifically to the constituent foil thereof, or in that a larger angle would generate bending radii in the coated part of the electrode which, during manufacture, or specifically over the service life of the battery, might produce an alteration in the coating which would adversely affect the cell function, such as e.g. the detachment of the coating from the metal foil of the electrode. The flags in a flag stack can thus be mutually bonded in a simple and space-saving manner.

According to one form of embodiment, edges of non-external terminal-adjacent flags in a flag stack which are averted from the electrode stack are arranged with a smaller clearance to the electrode stack than the corresponding edges of external terminal-adjacent flags, and adjoining flags are mutually materially bonded along one of their edges. In other words (relative e.g. to a vertically positioned battery cell), those flags extending from electrodes which are closer to a plane of the external terminal extend further upwards than the flags of electrodes which are arranged further away. Adjoining flags are then mutually materially bonded on or along the edge of both flags which is arranged at the least removed distance.

According to one form of embodiment, adjoining flags in a flag stack are locally curved, in a bonding region in which they are mutually materially bonded, such that they are mutually oriented in parallel.

In other words, adjoining flags in a flag stack, in remote sub-regions thereof, are oriented at an acute angle relative to each other, as they project from different electrode sub-regions, which extend in planes which are arranged with differing clearances to the plane of the external terminal, and are obliquely routed to the associated external terminal. Specifically, non-external terminal-adjacent flags are mutually bonded in bonding regions which are remote from the associated external terminal. Specifically, as these flags are also to be mutually bonded over a large surface, in the interests of adequate current-carrying capacity, it can be advantageous if the flags are not mutually bonded at an acute angle relative to each other, but that the ends of these flags are curved beforehand in the bonding region, such that the latter, at least over a short length of, for example, 0.5 mm to 2 cm, and preferably of 1 mm to 5 mm, are mutually oriented in parallel. In a mutually parallel-oriented bonding region of this type, the flags can then be mutually materially bonded, in a simple and large-surface arrangement, preferably by means of a joining method which involves no filler material.

By the use of a filler material for the bonding of joints, the individual metal foils, even before joining, might assume a mutual clearance, or be oriented at a mutual angle, with no parallel region.

According to one form of embodiment, flags can be respectively stacked in two flag stacks, which are arranged on opposing sides of the associated external terminal, and are respectively materially bonded with one of the opposing sides thereof.

In other words, flag stacks can not only be arranged on one side of the associated external terminal, but the flags of electrodes which are to be mutually electrically bonded can be combined in two stacks, and the associated external terminal can then be interposed between these two stacks and electrically bonded to the respective flags. Space required can be further reduced as a result.

According to one form of embodiment, the flags in a flag stack can be mutually bonded, and bonded to the associated external terminal, along a plurality of lines which, at least in certain areas, are mutually parallel. In other words, rather than the mutual bonding of the flags in a flag stack, for example, by means of a single planar bond, it can be provided that the flags are mutually bonded in linear regions. Linear bonding of this type can contribute to the reduction of the transmission resistance between the bonded flags and the external terminal, and can be simply and reliably executed by means of various technologies.

According to one form of embodiment, the flags in a flag stack are mutually bonded, and bonded to the associated external terminal, by thermal joining. Thermal joining permits the mechanically-stable and materially-bonded connection of the flags to the external terminal, with simultaneously low electrical transmission and contact resistances.

Different types of thermal joining can be employed, the details of which may differ, with respect to both the nature of the formation of the electrical bond between the components, and to the resulting structural properties of the bond.

For example, the flags in flag stack can be mutually bonded, and bonded to the associated external terminal, by welding. By welding, flags can be bonded to the external terminal in a highly stable and reliable long-term arrangement, which is specifically advantageous under conditions of intense vibration, of the type encountered in applications in motor vehicles.

Specifically, the flags in a flag stack can be mutually bonded, and bonded to the associated external terminal, without the addition of welding filler materials. In principle, components can be welded together with the addition of welding filler materials, which are introduced during a welding process, for example in the form of welding rods or consumable welding electrodes, which are partially deposited in the region of the welded joint. For the mutual welding of flags, and the welding thereof to the external terminal, however, the use of welding filler materials can be advantageously omitted, wherein welding is effected exclusively by the melting of the materials of the components which are to be welded. As a result, a welded joint of exceptional stability and low electrical resistance can be achieved.

In a specific configuration, the flags in a flag stack can be mutually bonded, and bonded to the associated external terminal, by welding with high-energy radiation. High-energy radiation effects the localized heat-up of the components to be welded, and permits irradiation with a high degree of positional accuracy and accurate dosing. During the manufacture of electrical energy stores, specifically such as battery cells, this can permit the space-saving welding of components, together with the protection of other thermally-sensitive components such as, for example, a chemical cell.

For example, the flags and the external terminal can be mutually bonded by means of laser beam welding or electron beam welding. Laser beam welding, inter alia, permits exceptionally rapid welding, is very well-proven in industrial applications, and can be deployed cost-effectively. Electron beam welding permits, inter alia, a very low input of heat to the components to be welded. Both laser welding and electron beam welding produce typical structural manufacturing properties, which can be detected in the finished welded joint.

Specifically, it can be advantageous if the flags in a flag stack are mutually bonded, and bonded to the associated external terminal, by means of a force-free welding method. Contactlessly-executed, and thus force-free welding methods including, for example, the above-mentioned laser welding or electron beam welding, in which no welding device enters into mechanical contact with the components to be welded, and can thus exert no forces upon the latter, permit the avoidance of the mechanical loading of components such as, for example, thin, foil-type flags, during welding, such that the latter are not distorted by mechanical forces. This contributes to the quality of the resulting welded joint, and can be detected structurally in the finished welded joint. However, a given position in these foils can be formed beforehand by clamping means, where applicable, such that a force is introduced to the foils.

It is hereby observed that a number of the potential characteristics and advantages of the invention are described herein with reference to different forms of embodiment. A person skilled in the art will be aware that these characteristics can be combined, adapted or interchanged in an appropriate manner, in order to obtain further forms of embodiment of the invention.

BRIEF DESCRIPTION OF THE DRAWINGS

Forms of embodiment of the invention are described hereinafter with reference to the attached drawings, wherein neither the drawings nor the description constitute any restriction of the invention.

The figures are schematic only, and are not true to scale. Identical reference symbols in the figures identify identical or equivalent characteristics.

DETAILED DESCRIPTION

Figure 1:
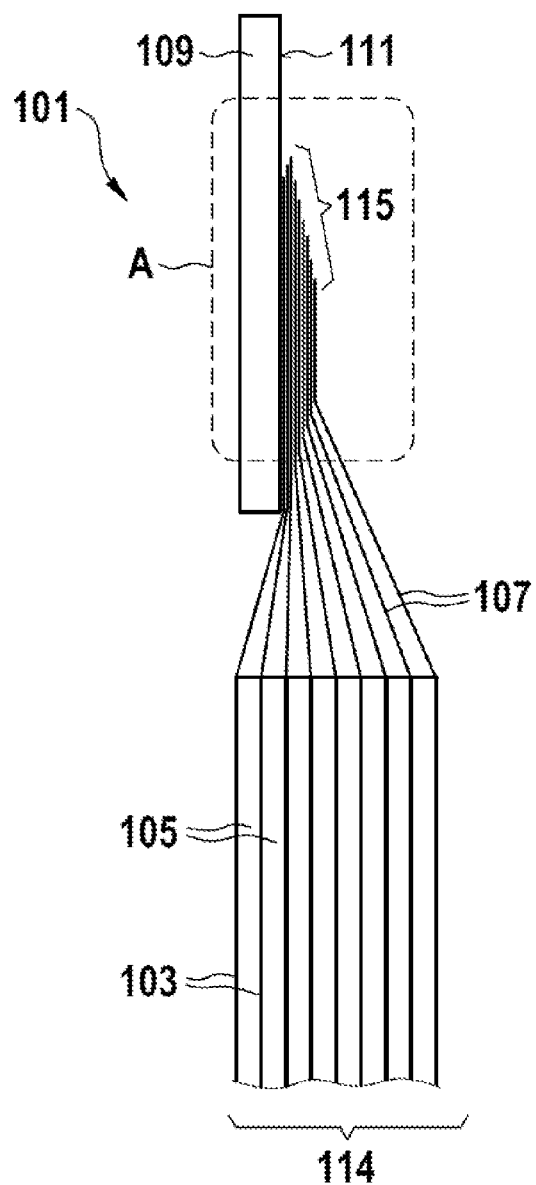
FIG. 1 shows a sectional view of a conventional electrical energy store, with single-sided contacting of the diverter.

FIG. 1 shows a sectional view of a conventional electrical energy store 101. The energy store 101, in the form of a battery cell, comprises a plurality of flat electrodes 103, which are mutually spaced and configured in a mutually parallel arrangement in an electrode stack 114, and between which active material 105 is interposed. Each of the foil-type metallic electrodes 103, on its upper lateral edge, incorporates a flag 107. The likewise foil-type flag 107 is electrically, and preferably integrally bonded to the electrode 103, and projects from the latter to an external electrical terminal 109. The electrodes 103, the active material 105, the flags 107 and the greater part of the external terminal 109 are accommodated in a housing (not represented).

Figure 2:
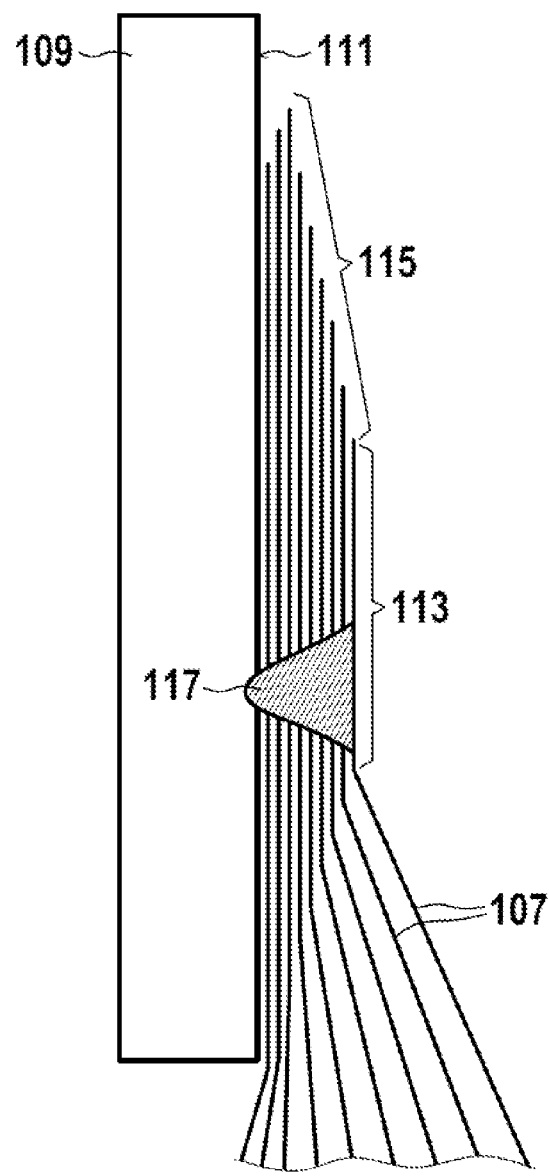
FIG. 2 shows an enlarged view of an electrode interconnection, in the region marked "A" in FIG. 1.

In FIG. 2, the region A marked with a broken line in FIG. 1, in which the electrodes 103, by means of their flags 107, are mutually interconnected and interconnected with the external terminal 109, is represented in an enlarged view. In the conventional electrical energy store 101, all the flags 107 are essentially of equal length. However, as the flags 107 originate from different electrodes 103, which are arranged with different clearances to the plane in which the external terminal 109 is located and, starting from the edge of the respective electrode 103, are thus routed obliquely to the external electrical terminal 109, sub-regions of the flags 107 of different lengths overlap with a surface 111 of the external terminal 109. An overlap is therefore shorter, the greater the distance that the respective flag 107 needs to be routed from a further-removed electrode 109 to the surface 111 of the external terminal. In an overlapping region 113, in which all the flags 107 in a flag stack 115 which is to be bonded to the external terminal 109 mutually overlap, the flags 107 are oriented in parallel with the surface 111 of the external terminal 109, where they are mutually bonded, and bonded with the external terminal 109, for example by means of a welded joint 117.

The arrangement whereby the electrodes 103, by means of their flags 107, are conventionally interconnected and welded to the external terminal 109 produces a relatively large structural form as, firstly, the flags projecting from the different electrodes 103 need to be routed over different distances to the external terminal 109 and, secondly, must overlap to a sufficient extent at this point, in order to permit the formation of the welded joint 117.

In order to reduce the structural space required, a different type of electrode interconnection is proposed.

Figure 3:
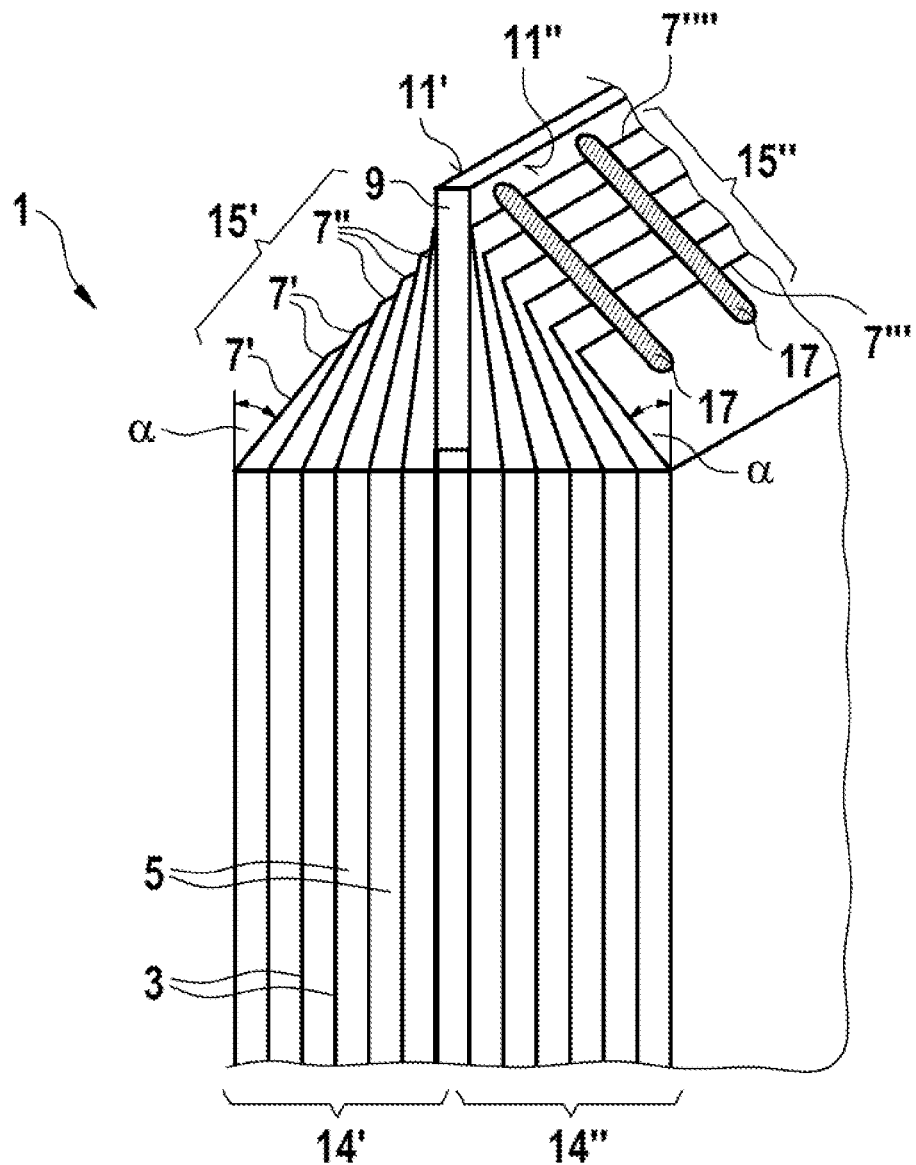
FIG. 3 shows a perspective view of an electrical energy store according to the invention.

FIG. 3 shows a perspective view of an electrical energy store 1 with an electrode interconnection of this type. A plurality of flat electrodes 3, including the active material 5 interposed between the latter, are stacked one on top of another, and combined to form electrode stacks 14', 14". The electrodes 3 are comprised of an electrically conductive material, specifically of a metal such as, for example, copper or aluminum, or alloys thereof. The electrodes 3 can be configured as thin foils. From each of the electrodes 3, upward and laterally-projecting flags 7 are routed obliquely to an external electrical terminal 9. Non-external terminal-adjacent flags 7' are thus oriented at a greater angle α, relative to an extension plane of the associated electrode 3, than terminal-adjacent flags 7". The plurality of flags 7 are thus combined in two flag stacks 15', 15", which are respectively routed to opposing surfaces 11', 11" of the external terminal 9.

However, the various flags 7, as in a conventional electrode interconnection, are not routed with all their end regions mutually parallel, and parallel to the surface 111 of the external terminal 109, to a single position where they are mutually bonded and bonded to the external terminal 109 by means of a welded joint 117. Specifically, the various flags 7 are not all of equal length.

Figure 4:
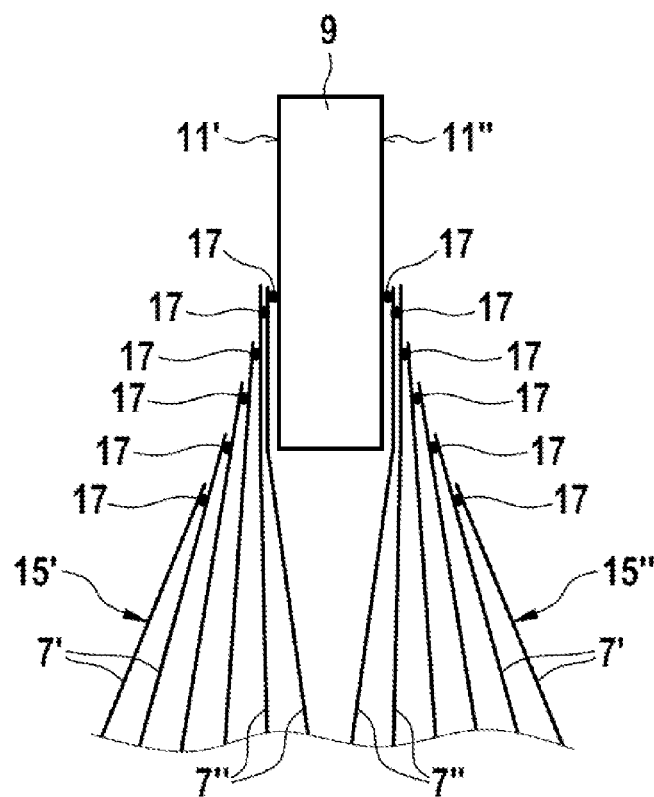
FIG. 4 shows an enlarged sectional view of an electrode interconnection in an electrical energy store according to the invention.

Instead, non-external terminal-adjacent flags 7' are significantly shorter than external terminal-adjacent flags 7" i.e., for example, less than half the length thereof. Thus, as clarified in the lateral view shown in FIG. 4, for the majority of flags 7, a welded joint 17 between two directly adjoining flags 7 is arranged in a region in which the two flags 7 are not yet adjacent to the external terminal 9, and in which the flags 7 are specifically oriented in an inclined direction to the surface 11 of the associated external terminal 9.

The welded joint 17 of adjoining flags 7 can thus be executed locally, i.e. virtually in the manner of a spot weld, in a region in which the latter are configured in a directly adjoining or cooperating arrangement. Where applicable, at least one of the flags 7 to be welded can be locally curved such that, at least in this region, it is oriented in parallel to the adjoining flag 7, such that two flags 7 can lie flush to each other, and a planar bond can thus be easily formed between the latter.

Alternatively, welded joints 17 can also be configured in a linear arrangement, as represented in the example shown in FIG. 3. The linear welded joint 17 thus extends from the outermost, non-external terminal-adjacent, and thus the shortest flag 7''' to the innermost, external terminal-adjacent, and thus the longest flag 7'''', and thereby bonds successive and respectively adjoining pairs of flags 7. Advantageously, a plurality of linear welded joints 17 can extend over a single flag stack 15, thereby increasing the mechanical stability of the bond, while simultaneously reducing the electrical resistance thereof.

Figure 5:
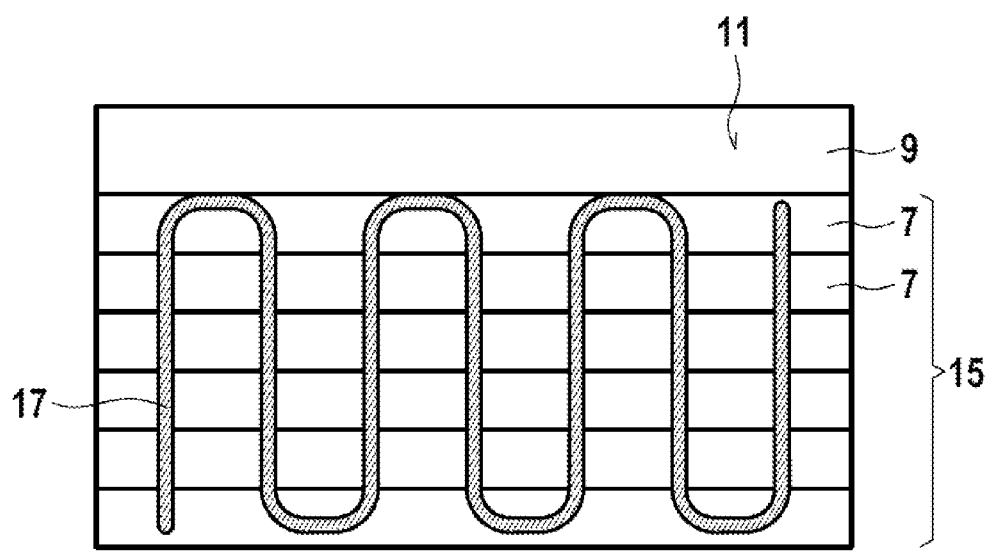
FIG. 5 shows a lateral view of an electrode interconnection in an electrical energy store according to the invention.

As a further alternative, as illustrated in the overhead view shown in FIG. 5, a linear welded joint 17 can be configured as a meander over the partially-overlapping end regions of the flags 7 in a flag stack 15, thereby producing a large-surface, and consequently a stable bond of low electrical resistance.

Welded joints 17 can preferably be executed by laser beam welding. However, other welding methods, specifically other force-free welding methods involving high-energy radiation such as, for example, electron beam welding, can also be employed. Other welding methods involving high-energy radiation are also conceivable, including, for example, plasma welding, MIG (metal inert gas) welding, MAG (metal active gas) welding, etc.

Specifically, by the employment of force-free welding methods, potential is provided, by the application of corresponding process strategies, for the production of fewer particles than in conventionally-employed ultrasonic welding. Such particles can be responsible for short-circuits, for example in a battery cell, thereby generating a "0-km" fault.

Moreover, a risk of damage to other components in an energy store, for example to a sensitive chemical cell in a battery cell, can be reduced by the execution of a welded joint, specifically by laser beam welding or electron beam welding, in an optimized arrangement for this purpose. For example, the direction in which the welding laser beam is oriented to the flags 7 during welding can be optimized with respect to the setting angle of the laser beam, such that further overlapping flags 7 can execute a protective function for the chemical cell.

Moreover, a sequence in which welded joints are executed on a flag stack 15 can be optimized such that a localized input of heat to the energy store, and specifically to the heat-sensitive components thereof, is minimized.

The use of laser scanners permits further optimized process strategies, such as sweeping or other high-speed welding methods.

As a result of the modified geometries of the various flags 7, in comparison with conventional electrode interconnections, and the different electrical bonding of the flags 7, specifically the configuration thereof in different positions, the electrode interconnection proposed herein can generate a substantial space saving in an electrical energy store 1, specifically in a battery cell. The volumetric efficiency of the energy store 1 can be increased accordingly. Moreover, by the shorter configuration of the outer flags 7' than the inner flags 7", in comparison with conventional electrode interconnections, material can be saved. As a result, the power-weight ratio of the energy store 1 can be increased, thereby contributing to a reduction in energy consumption, for example in motor vehicle applications. Moreover, material costs associated with the production of the energy store can be reduced.

The proposed specific type of electrode interconnection is appropriate for electrical energy stores 1 in a wide variety of fields of application. For example, battery cells can be equipped therewith in E-mobility applications, but also in consumer electronics, centralized or decentralized energy storage, air travel and space travel, etc. The employment of electrode interconnection in other electrical energy stores, such as, for example, high-capacity capacitors, can also be beneficial.

In conclusion, it should be observed that terms such as "incorporating", "comprising" etc. do not exclude any other elements or steps. Reference numbers in the claims are not to be considered as restrictive.

What is claimed is:

1. An electrical energy store (1), comprising:
   flat electrodes (3);
   flags (7) projecting laterally from the electrodes (3);
   external terminals (9);
   wherein a plurality of electrode regions are respectively stacked, one on top of another, to form an electrode stack (14);
   wherein a plurality of the flags (7) are arranged one on top of another in a flag stack (15), and are respectively materially bonded, both mutually and with a surface (11) of an associated external terminal (9); and
   wherein at least one flag (7) of the plurality of flags (7) in the flag stack (15), which is bonded to the associated external terminal (9), is materially bonded to a respectively adjoining flag (7) in a region in which the at least one flag (7) is oriented in an inclined direction at an angle (a) to the surface (11) of the associated external terminal (9), wherein the angle of the at least one flag is greater than 0.5 degrees.

2. The electrical energy store according to claim 1, wherein different flags (7) in a flag stack (15) project to a different extent beyond the edge of the electrode (3).

3. The electrical energy store according to claim 1, wherein non-external terminal-adjacent flags (7') in a flag stack (15) project beyond the edge of the associated electrode (3) to a lesser extent than the external terminal-adjacent flags (7") in the flag stack.

4. The electrical energy store according to claim 1, wherein non-external terminal-adjacent flags (7') in a flag stack (15), in a bonding region in which they are respectively materially bonded to an adjoining flag (7), are arranged at a greater angle, relative to the surface (11) of the associated external terminal (9), than external terminal-adjacent flags (7") of the flag stack (15), in the bonding region thereof.

5. The electrical energy store according to claim 1, wherein edges of non-external terminal-adjacent flags (7') in a flag stack (15) which are averted from the electrode stack (14) are arranged with a smaller clearance to the electrode stack (14) than the corresponding edges of external terminal-adjacent flags (7"), and adjoining flags are mutually materially bonded along one of their edges.

6. The electrical energy store according to claim 1, wherein adjoining flags (7) in a flag stack (15) are locally curved, in a bonding region in which they are mutually materially bonded, such that they are mutually oriented in parallel.

7. The electrical energy store according to claim 1, wherein flags (7) are respectively stacked in two flag stacks (15', 15"), which are arranged on opposing sides (11', 11") of the associated external terminal (9), and are respectively materially bonded with one of the opposing sides (11', 11") thereof.

8. The electrical energy store according to claim 1, wherein the flags (7) in a flag stack (15) are bonded, and bonded to the associated external terminal (9), along a plurality of lines which, at least in certain areas, are mutually parallel.

9. The electrical energy store according to claim 1, wherein the flags (7) in a flag stack (15) are mutually bonded, and bonded to the associated external terminal (9), by thermal joining.

10. The electrical energy store according to claim 1, wherein the flags (7) in a flag stack (15) are mutually bonded, and bonded to the associated external terminal (9), by welding.

11. The electrical energy store according to claim 1, wherein the flags (7) in a flag stack (15) are mutually bonded, and bonded to the associated external terminal (9), by welding without the addition of welding filler materials.

12. The electrical energy store according to claim 1, wherein the flags (7) in a flag stack (15) are mutually bonded, and bonded to the associated external terminal (9), by means of high-energy radiation welding.

13. The electrical energy store according to claim 1, wherein the flags (7) in a flag stack (15) are mutually bonded, and bonded to the associated external terminal (9), by means of welding by a force-free welding method.

14. The electrical energy store according to claim 1, wherein the angle of a majority of the plurality of flags is greater than 0.5 degrees.

15. The electrical energy store according to claim 1, wherein the angle of all of the plurality of flags are is greater than 0.5 degrees.

16. The electrical energy store according to claim 1, wherein the terminal is positioned between at least two of the plurality of flags.

17. The electrical energy store according to claim 1, wherein the plurality of the flags (7) is a first plurality of flags, and further comprising:
   a second plurality of flags arranged one on top of another in a second flag stack (15), and are respectively materially bonded, both mutually and with a surface (11) of an associated external terminal (9), the second plurality of flags positioned on an opposite side of the terminal from the first plurality of flags; and
   wherein at least one flag (7) of the second plurality of flags (7) in the second flag stack (15), which is bonded to the associated external terminal (9), is materially bonded to a respectively adjoining flag (7) in a region in which the at least one flag (7) is oriented in an inclined direction at an angle (a) to the surface (11) of the associated external terminal (9), wherein the angle of the at least one flag is greater than 0.5 degrees.

* * * * *